Figure 1:
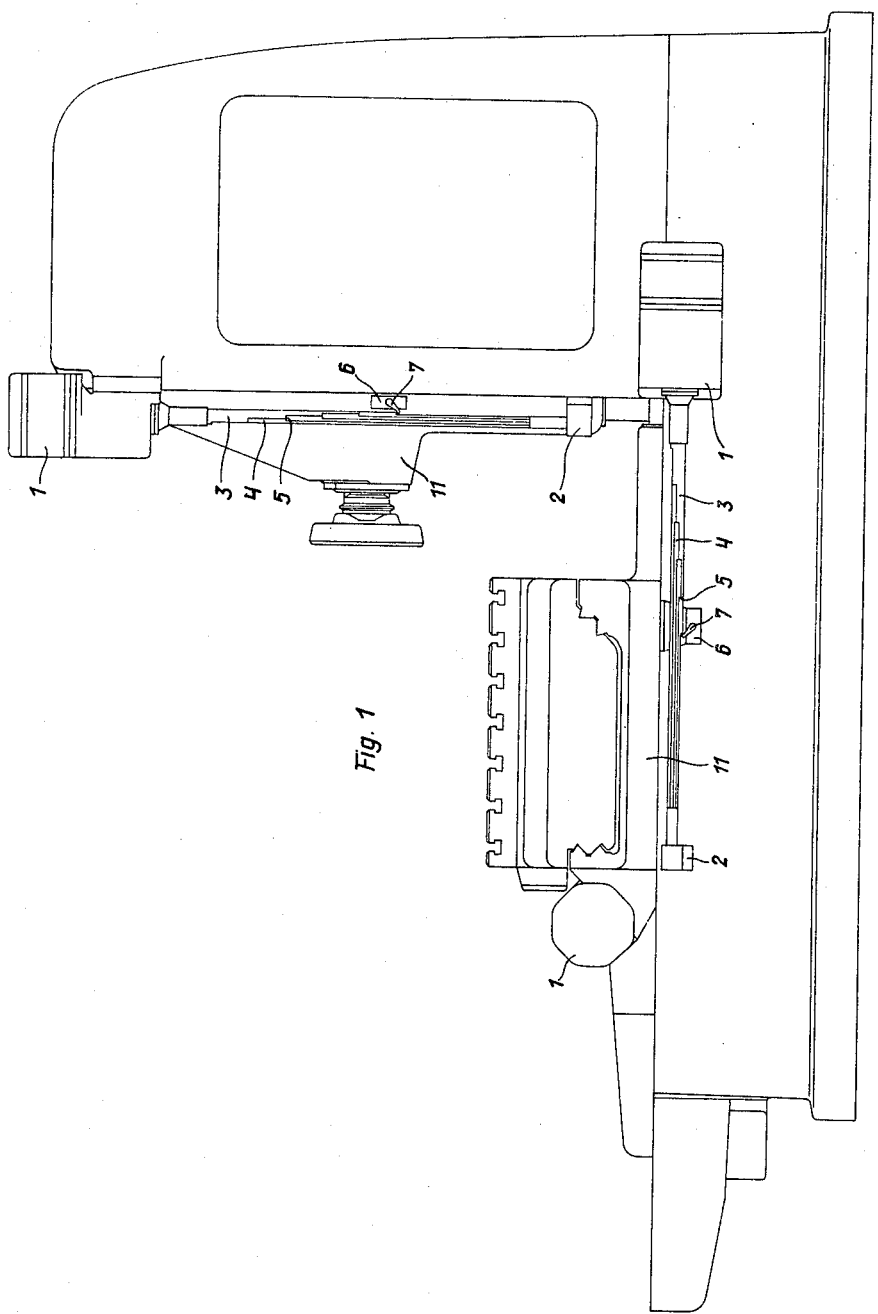

Oct. 5, 1965

A. MOOSMANN 3,209,654

DEVICE FOR AUTOMATICALLY ADJUSTING OR LIMITING
THE TRAVEL OF THE SLIDE IN MACHINE TOOLS

Filed Oct. 22, 1962

7 Sheets-Sheet 1

Inventor:
A. Moosmann

By
Watson, Cole, Grindle + Watson
Attys.

Oct. 5, 1965    A. MOOSMANN    3,209,654
DEVICE FOR AUTOMATICALLY ADJUSTING OR LIMITING
THE TRAVEL OF THE SLIDE IN MACHINE TOOLS
Filed Oct. 22, 1962    7 Sheets-Sheet 2

Inventor:
A. Moosmann
By
Watson, Cole, Grindle & Watson
Attys.

United States Patent Office 3,209,654
Patented Oct. 5, 1965

3,209,654
DEVICE FOR AUTOMATICALLY ADJUSTING OR LIMITING THE TRAVEL OF THE SLIDE IN MACHINE TOOLS
Alois Moosmann, 11 Muttergartenweg, Stuttgart-Birkach, Germany
Filed Oct. 22, 1962, Ser. No. 232,217
Claims priority, application Germany, Oct. 23, 1961, M 50,662
12 Claims. (Cl. 90—16)

This invention relates to a device for automatically regulating, and especially limiting, the travel of the slide in machine tools or the like with the aid of a scale or the like on which are indicated the measurement values to be set into the device and with which a member controlling the drive of the slide is adapted to cooperate as a feeler.

Both in machine tools with a tool slide that is moved lengthwise relatively to a rotating workpiece and in machines with a workpiece-carrying slide that is moved lengthwise relatively to a rotating tool, the travel of the slide must be regulated to suit the required dimensions of the workpiece, and in this connection the usual requirement, except in the case of copying procedures, is for limiting the travel of the slide either at the beginning or end of working cycles or when it arrives in a predetermined position with respect to two coordinates. The necessary linear measurements must be transmitted to the machine in a predetermined sequence, and in most cases the number of such measurements is relatively large.

It is known, in connection with manually operated machine tools, to make use of scales provided with stops or projections which must be readjusted for each series of workpieces with a resulting substantial expenditure of work and time. In the case of series of workpieces which are frequently repeated, the carrier for the stops or projections, e.g., a carrier in the form of a strip, may also be removed and replaced as a whole. In this case, the number of measurements that are to be fed into the machine is very limited.

Consequently, in the course of automation of machine tools, electronic and photoelectric devices have also been developed, which transmit to the machine the desired distances of travel of the slide in the form of numbers, together with the operating instructions. In this case, the relatively weak signals coming from the control means, e.g., from a perforated strip, must be resolved, amplified and evaluated in a complicated manner in order to determine the length of travel of the slide. The amount of electronic and similar equipment used in these devices is so considerable that the high total cost of the same often prevents them from being used in practice.

It is an object of this invention to provide a valuable and generally useful slide travel controlling device which operates mechanically and preferably pneumatically to make possible the automatic control of the slide travel according to measurements which are fed to it in any desired sequence.

The invention consists essentially in the fact that there is provided for use as the scale a measuring roller or the like having on its circumference flattened parts of various different lengths and ending in measuring surfaces adapted for cooperation with a feeler element, the said measuring roller being rotatable, for coarse adjustment to the flattened part corresponding to the required approximate value, by adjusting motors set in operation according to the said programmed values and being axially displaceable, for fine adjustment, through a distance corresponding to the more exact value within the range between successive approximate values provided by the coarse adjustment.

According to a preferred embodiment of the invention, the measuring roller is provided with ten flattened surfaces distributed at angular intervals of 36° around its circumference, these flattened surfaces being of different lengths progressively increasing one with respect to the other by equal increments and their measuring surfaces being formed by the plane surfaces at their ends. For rotating the measuring roller so that the flattened surface thereon corresponding to the numerical magnitude of the approximate value lies opposite the feeler member, an adjusting motor is provided which, in response to an impulse corresponding to the numerical magnitude and originating from a store, effects the adjustment of the measuring roller to one of the ten angular positions. The fine adjustment, i.e., the axial displacement of the measuring roller within the coarse adjustment range which may, for example be 100 mm. in length, is obtained by further adjusting motors which are controlled according to the numerical magnitude of the more exact value and the number of which corresponds to the required number of places of decimals for the dimensions.

The adjusting motors for rotating and for axially rotating the measuring roller may be constructed and arranged to operate in various alternative ways. According to a particularly advantageous embodiment of the invention, the adjusting motors consist of bodies which are preferably cylindrical and which are arranged to rotate about their axes. These bodies are each provided with two cam surfaces which slope upwardly from a lowermost point and upon which, at any moment, one of several, preferably ten, pistons urged towards them by compressed air or by some other pressure fluid, act in such a manner that the cylinder or other body provided with the cam surfaces is rotated or axially displaced by the resulting force acting at right angles to the piston axis until the lowermost point of the cam surfaces is brought into a position where it lies directly beneath the centre of the piston exerting the displacement-producing force. The movement of this cylinder or other body can be transmitted by gearing directly to the measuring roller for the purpose of rotating the same or to a rotatable, but not axially displaceable, screw-threaded nut which, as a result of its rotation, displaces the measuring roller axially by the required amount. The cylindrical body carrying the cams, as well as the gearing, may be arranged concentrically with respect to a common axis, by which means an extraordinarily compact construction is achieved. This is of particular importance for machine tools, because the apparatus arranged in this manner occupies only a very small amount of space.

The rotary movements of the cam cylinder or cam discs can, after being magnified or reduced by the gearing, be combined by means of spur gear differentials so that they yield a common sum, i.e., an end value, which corresponds to the required more exact measured value and is transmitted to the screw-threaded nut. The resulting rotation of the nut then displaces the measuring roller through a distance corresponding to the appropriate numerical value.

Figure 2:
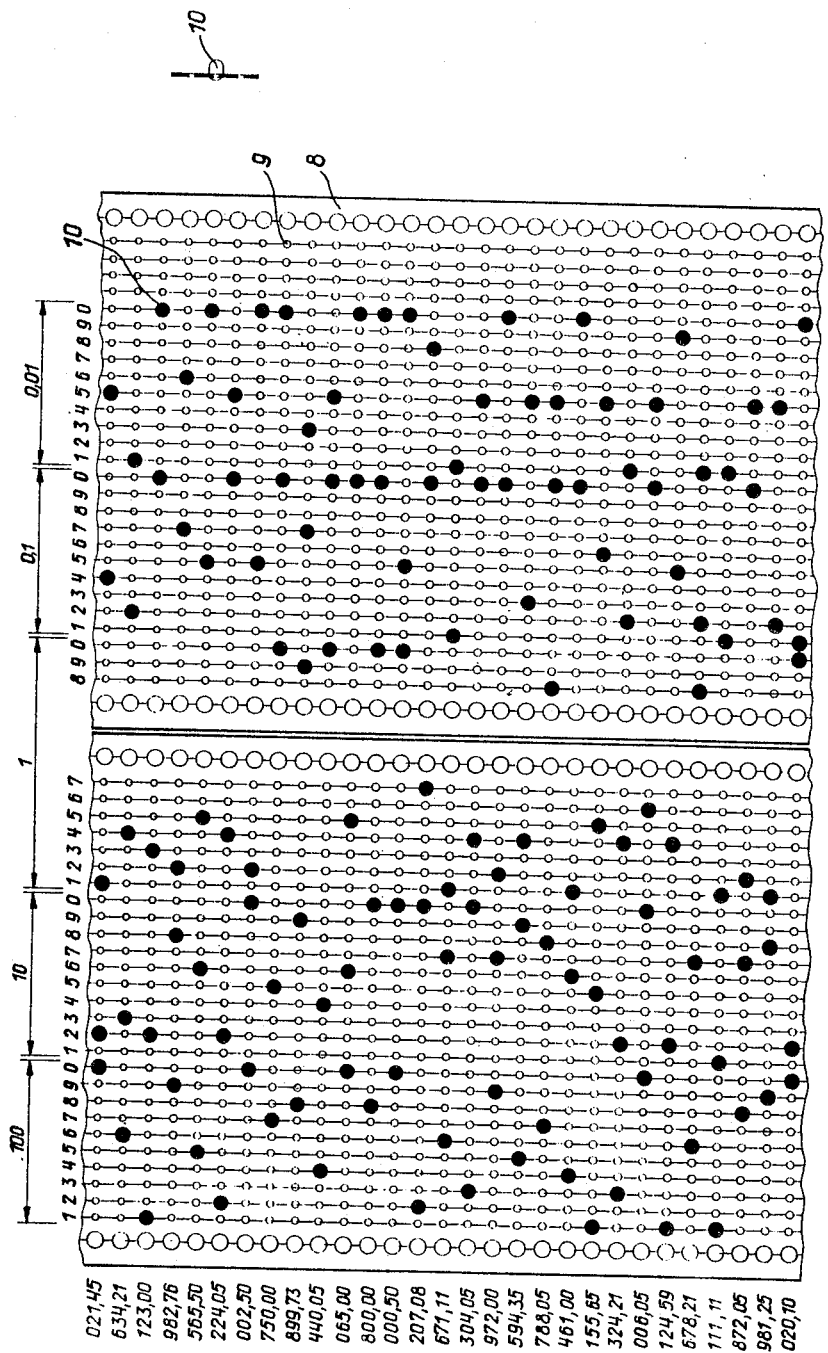
Figure 3:
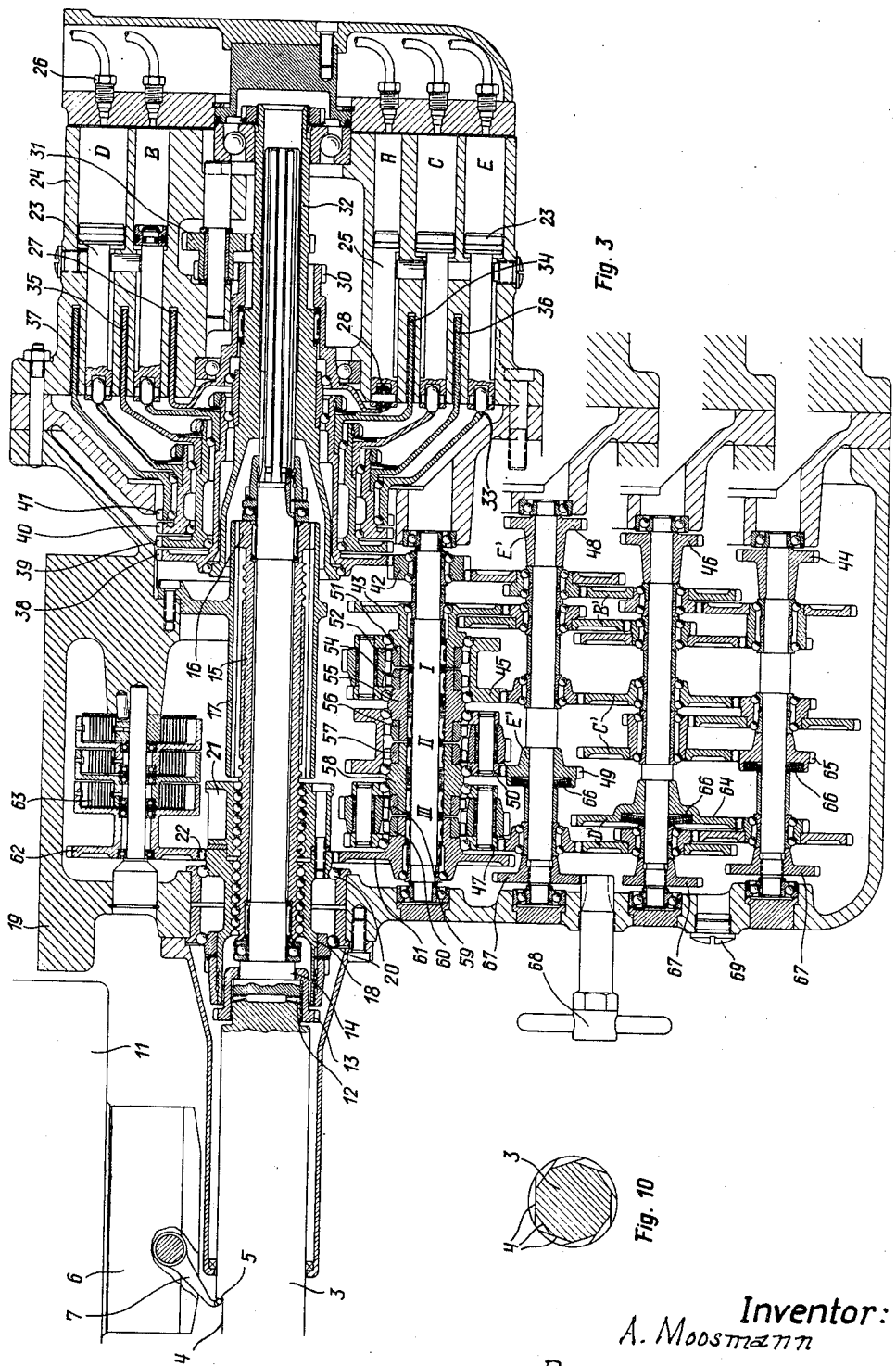
Figure 4:
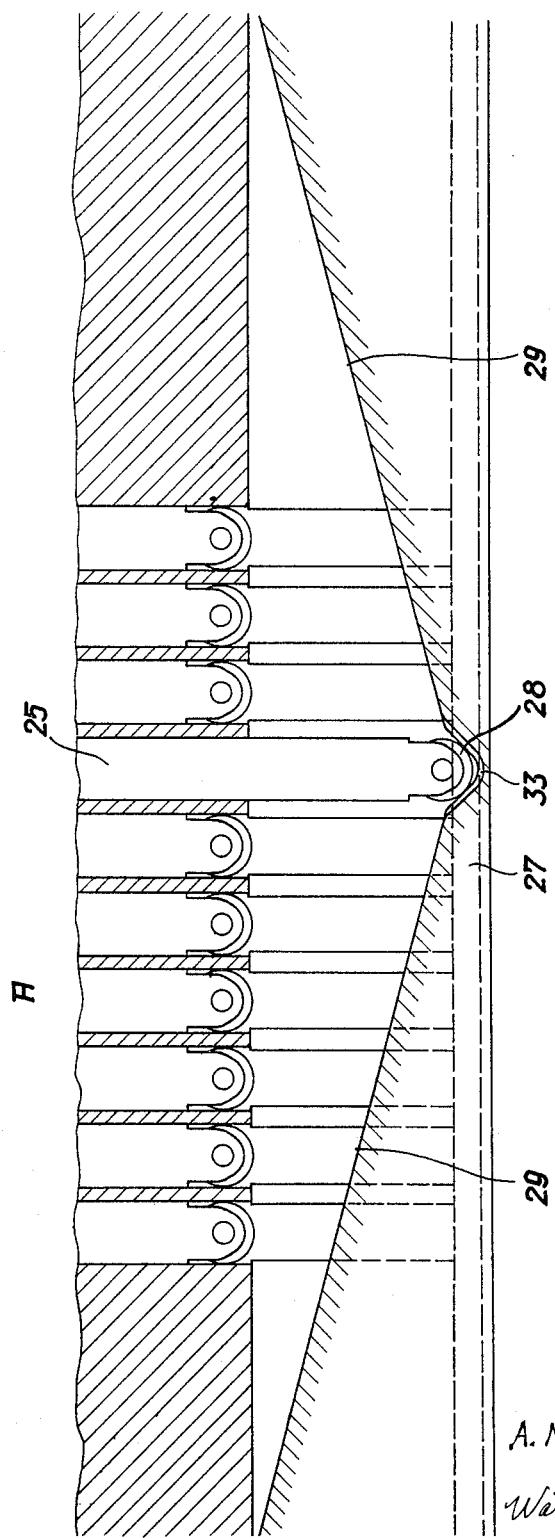
Figure 5:
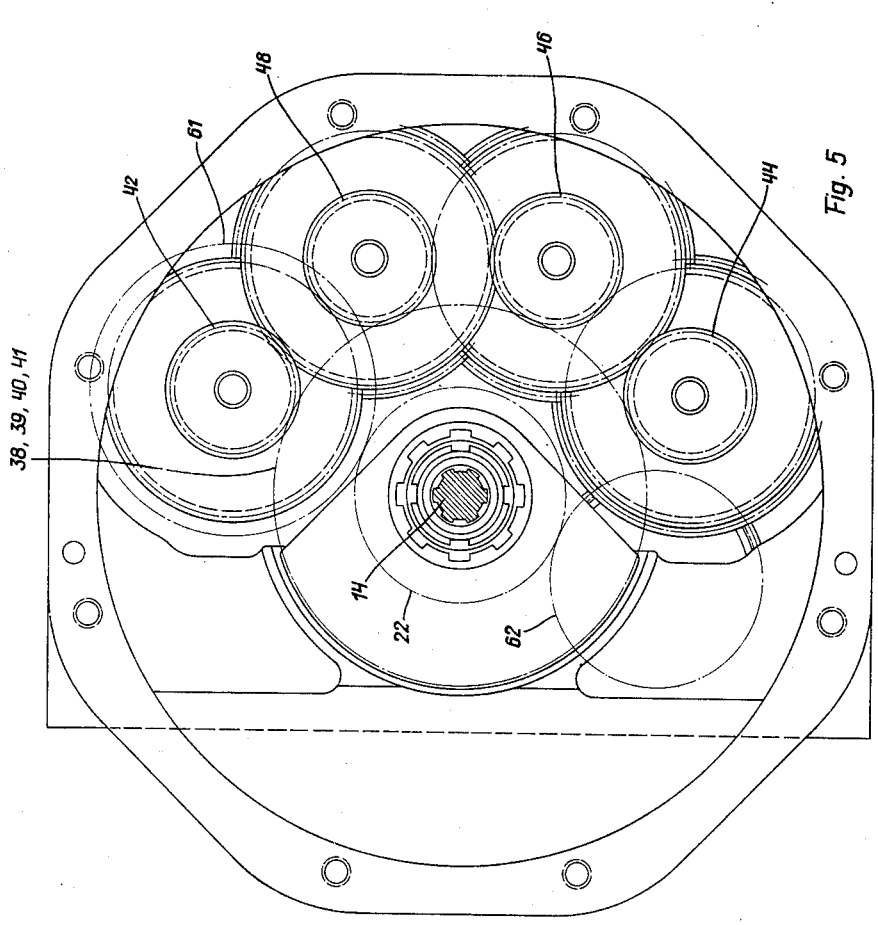
Figure 6:
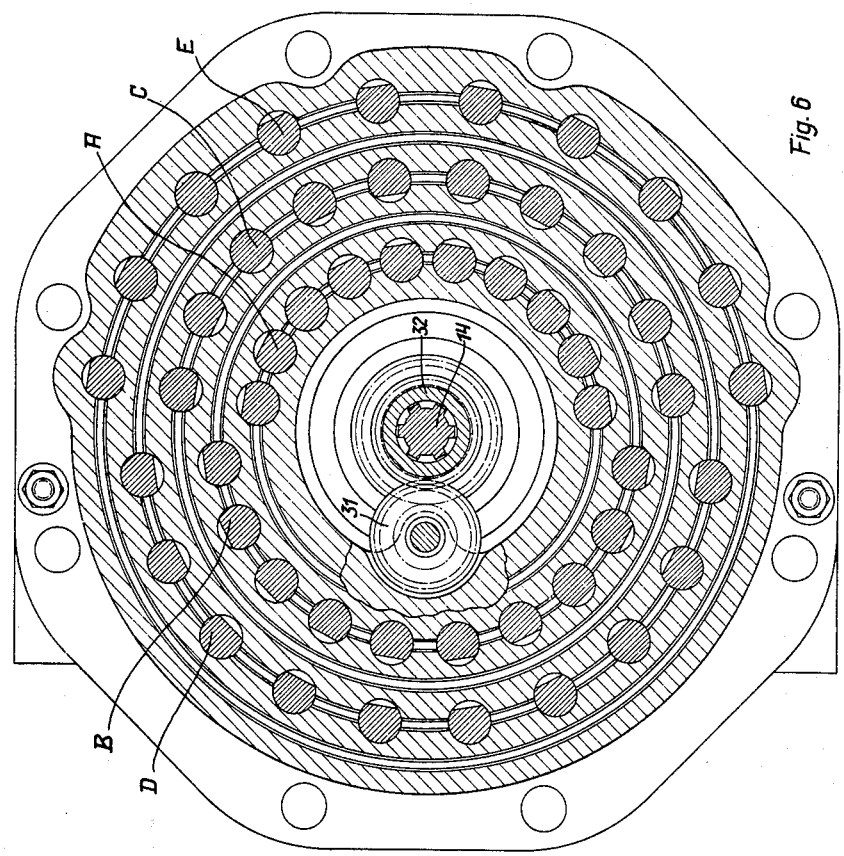
Figure 7:
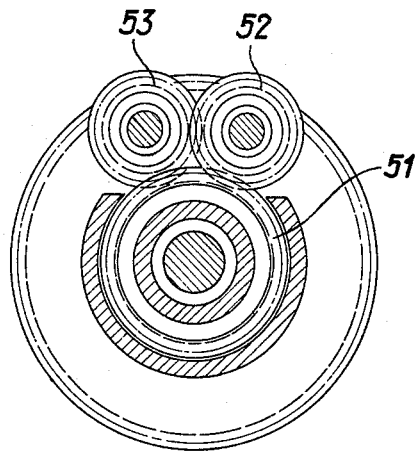
Figure 8:
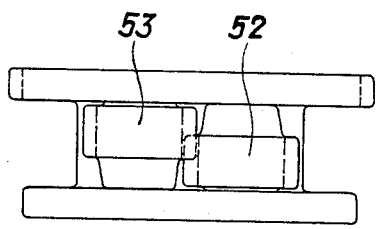
Figure 9:
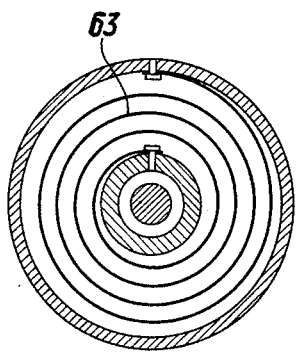

A constructional embodiment of this invention is illustrated in the accompanying drawings, in which:

FIG. 1 is a schematic general view showing a machine tool provided with three fine measurement selecting devices according to the invention, FIG. 2 is a plan view broken away at the top and bottom of a dimension store in the form of a band, FIG. 3 is a longitudinal section through the device, in which the transmission gearing is shown developed, FIG. 4 is a developed view of a face cam on an adjusting cylinder, showing the adjusting pistons, FIG. 5 is an end view, as seen from the right side of FIG. 3, showing the arrangement of the shafts of the transmission gearing, FIG. 6 is a section through the shafts of the selector pistons, FIG. 7 is a section through one spur gear wheel differential, shown separately from the device as a whole, FIG. 8 is a side elevation of a spur gear wheel differential, FIG. 9 is a section through a spring housing, shown separately from the device as a whole, and finally FIG. 10 is a section through the measuring roller.

In the boring or milling machine illustrated by way of example in FIG. 1, three fine measurement selector devices 1 are provided for adjusting the slide in the vertical, longitudinal and transverse directions respectively. Between the adjusting device 1 and a thrust bearing 2, a measuring roller 3 is mounted so as to be rotatable and also axially slidable e.g. through a distance of 100 mm. The measuring roller 3 is, as can be seen from FIG. 10, provided with ten flattened surfaces 4 distributed at intervals of 36° around its circumference. In the embodiment illustrated, each of the flattened surfaces 4, the centre-lines of which are parallel to one another, is exactly 100 mm. shorter or longer than the next preceding flattened surface. The plane end surfaces 5 of the flattened surfaces 4 form measuring surfaces for engagement by the arm 7 of a feeler or end switch 6. The feeler 6 is mounted on the moving slide 11, while the fine measuring selector device 1 and the thrust bearing 2 together with the measuring roller 3 are secured on the stationary machine bed, on frame members of the machine or on the main slide.

The feeler 6 controls the sliding movement and especially also the direction of movement of the slide via clutches, oil pressure motors or the like, in such a manner that the slide continues to travel in the direction towards the fine measuring selector device 1 until the feeler arm 7 engages one of the measuring surfaces 5 at the end of the flattened surface 4 facing the said arm. If the measuring roller 3 is rotated so that a non-flattened part of its external diameter is in contact with the feeler arm 7, then the slide 11 will continue travelling in the direction towards the thrust bearing 2 until the feeler arm 7 can lie against the measuring surface of the flattened surface facing towards it. This construction and manner of operation has the advantage that the alteration of the setting of the measuring roller automatically determines the direction for the desired movement of the slide without any additional constructional expenditure being necessary for this purpose.

In FIG. 2 is shown a dimension store in the form of a steel band 8 which is subdivided for manufacturing reasons and which is provided with holes 9 arranged in rows or lines. Rivet heads 10 are inserted into certain of the holes 9 to represent a particular number. The rivet heads 10 cooperate with small compressed air valves controlled by the dimension storage band and forming part of a scanning device not shown in detail in the drawings. Each of these compressed air valves is arranged, on being actuated, to deliver a compressed air impulse to the selector device 1. The dimension store comprises five groups, each consisting of 10 numerals from 1 to 10, as hundreds, tens, units, tenths and hundredths respectively.

FIG. 2 shows how the rivet heads are inserted in the holes corresponding to the numerals in the several rows or lines, so that they represent the number indicated on the left side of the steel band 8. In this simple manner it is possible, without any resolution, to detect any number within the working range on the programme band, to feel it with the aid of the scanning device and to transfer it to the measurement selecting device 1. In the constructional embodiment illustrated, it is possible to represent $10^5$, i.e. a hundred thousand, different numbers; consequently a range of measurement of one metre in length can be subdivided into a hundred thousand parts, each of which amounts to a hundredth part of a millimetre.

In the longitudinal section of the measurement selector device shown in FIG. 3, the gear train is shown developed for the sake of clarity. The measuring roller 3 is not shown throughout its entire length, but only as far as to include a flattened surface 4 and a measuring surface 5 near its connection with the measurement selector device 1. The feeler arm 7 of a feeler 6 secured to a slide body 11 lies against the measuring surface 5. As is clear from FIG. 1, the measuring roller 3, with its various elongated flattened surfaces 4 and measuring surfaces 5, forms a support for the subdivision of one metre into hundredths of a millimetre. The coarse measurement value at any moment, i.e. the measurement range for example between 100 mm. and 200 mm. or between 200 mm. and 300 mm. is adjusted by rotating the measuring roller 3, so that the length of flattened surface corresponding to the measurement range at the moment in question is turned into the position facing the feeler arm 7 of the feeler 6.

For this purpose the measuring roller 3 is rigidly, but disengageably connected to a shaft 14 by means of a Hirth toothed ring on its end face and a retaining cap nut 13. The shaft 14 is rotatably mounted without axial play in a screw-threaded sleeve 15. The sleeve 15 is mounted so that its thickened part 16 is slidably, but not rotatably, guided by means of its multi-splined external profile within a flanged tube 17. A nut 18 having a ball-race screw-thread is rotatably, but not axially displaceably, mounted in the casing 19 of the device by means of ball bearings 20. An opposed nut 19, also having a ball-race screw-thread, is screwed up against the nut 19 so that the balls in the ball-race screw-threads of both nuts are engaged with pre-tensioning in the screw-thread of the sleeve 15. In this manner, displacement of the sleeve 15, without play, with a minimum of friction and with maximum accuracy, is obtained when the nut 18 is rotated by a gear pinion 22. The axial displacement of the screw-threaded sleeve 15 and hence also of the measuring roller 3 is possible over a distance of 100 mm. and serves for subdividing each of the 100 mm. steps between the lengths of the flattened surfaces of the measuring roller 3 into 10,000 parts, so that the smallest possible adjustment has a longitudinal dimension of 0.01 mm.

The adjusting motors for imparting rotation and axial displacement to the measuring roller 3 are shown in FIG. 3 on the right side near the casing 19. For producing the axial displacement of the nut 18, four groups each consisting of ten compressed-air-operated pistons 23 are arranged in a common cylinder block 24. A further group of ten pistons 25 serves for rotating the measuring roller 3 into one of its ten possible angular positions. According to this embodiment of the invention, there are thus altogether in the common cylinder block 24 five piston groups each consisting of ten pistons. FIG. 6 shows the arrangement of the pistons in five half groups A, B, C, D and E. Each of the fifty cylinders for these pistons has a connection 26 for an air pipe by which the cylinder is connected to one of the fifty valves of the scanning device of the dimension store 8. Thus, when one of the rivet heads actuates a valve of the scanning device the corresponding cylinder of the measurement selecting device is filled with compressed air and thereby exerts a pressure against the corresponding piston 23 or 25.

The ten pistons 25 of the group of pistons A operate in any desired sequence against the cam disc 27 which is shown in FIG. 4, together with the piston group A, in a developed drawing. The piston temporarily acted upon by the compressed air transmits the force exerted by the latter via a roller 28 against the slope 29 of the cam disc or cam cylinder 27. The cam slope 29 converts the axially directed thrust of the piston 25 into a circumferentially acting force, i.e. into a force tending to rotate the cam disc 27. The resulting torque is transmitted by a pinion 30 mounted on the hub of the cam disc 27 to a double idler gear 31 and thence via a central sleeve 32 to the multi-spline profile of the shaft 14. Consequently, the shaft 14 is rotated together with the measuring roller coupled thereto. The cam disc 27 rotates until the depression 33 at the lowest point of both of its cam slopes comes to lie exactly beneath the corresponding piston 25. In this position, the roller 28 of the piston 25 engages in the depression 33 and thus holds the cam disc 27 stationary. The exactitude of this adjustment is still further increased by a transversely convex external shape of the roller 28 and by the outwardly oblique shape of the surfaces forming the side surfaces of the depression 33. The resulting component of force presses the body of the piston 25 against the wall of the cylinder bore, so that a fixing of the position of the cam disc 27 is obtained which is entirely free from play.

In exactly the same manner the relevant piston 23 of the piston group B cooperates with the cam disc 34, that of the piston group C with the cam disc 35, that of the piston group D with the cam disc 36 and that of the piston group E with the cam disc 37. All these cylindrical cam discs are arranged coaxially about the axis of the shaft 14, so that they occupy the minimum possible amount of space. The cam disc 34 is connected without play to the hub of a pinion 38. The cam disc 35 is likewise connected with the hub of a pinion 39 and the cam disc 36 with the hub of a pinion 40. The cam disc 37 is formed integrally with a pinion 41. These cam discs together with their pinions are mounted coaxially one within the other by means of anti-friction roller bearings. The cam disc 34 is mounted together with the pinion 38 on the central sleeve 32 and the latter is in turn rotatably mounted in the cylinder block. This arrangement provides a compact assembly which can be removed as a unit from the remainder of the apparatus or can be mounted independently as a unit, which is particularly advantageous for rational assembly.

The transmission of the rotary movements of the pinions 38, 39, 40 and 41 of the piston groups B, C, D and E to the gear wheel 22 of the nut 18, and the combining together of these movements, is obtained with suitable transmission ratios by means of four trains of gear wheels B', C', D' and E' and three spur gear differentials I, II and III.

The gear train B' connects the pinion 38 of the piston group B via a gear wheel 42 to the driving gear 43 of the differential I with a gear ratio such that the rotary advance of the cam disc 34 from one piston 23 of the piston group B to the next produces an axial displacement of the measuring roller 3 through a hundredth of a millimetre. The pinion 39 transmits its drive in a corresponding manner via a gear wheel 44 and the gear trains C' to the casing 45 of the differential I but with a gear ratio such that each advance of the cam disc 35 from one piston 23 of the piston group C to the next produces an axial displacement of the measuring roller 3 amounting to a tenth of a millimetre. Likewise, the pinion 40 transmits its drive via a gear wheel 46 and the gear train D' to the casing 47 of the differential III, in the case with a gear ratio such that each advance of the cam disc 36 from one piston 23 of the piston group D to the next produces an axial displacement of the measuring roller amounting to 10 mm. Finally, the pinion 41 transmits its drive via gear wheels 48 and 49 to the casing of the differential II with a gear ratio such that each advance of the cam disc 37 from one piston 23 of the piston group E to the next produces an axial displacement of the measuring roller amounting to one millimetre.

The differential I receives the hundredth part of a millimetre from the gear train B' via the gear wheel 43 and transmits it via the sun wheel 51, the planet wheel 52 and the second planet wheel 53 to an output sun wheel 54. The tenth of a millimetre from the gear train C' is similarly transmitted via the teeth on the differential casing 45 and the two planet wheels 52 and 53 to the output sun wheel 54. The output sun wheel 54 of the differential I is drivably connected via a hub 55 with the driving sun wheel 56 of the differential II. The sun wheel 56 thus feeds the hundredths and the tenths of a millimetre into the differential II, where, in a similar manner to the hundredths of a millimetre in the differential I, they are transmitted via two planet wheels to the output sun wheel 57. Just as in the differential I the tenths of a millimetre were fed in, so, in the case of the differential II, the millimetre displacement is transmitted from the gear train E' via the teeth on the differential casing 50 and the two planet wheels to the output sun wheel 57. The sun wheel 57 thus transmits the hundredths, tenths and unit millimetres via the hub 58 to the input sun wheel 59 of the differential III, whence they are likewise transmitted via two planet wheels to the output sun wheel 60. The teeth on the differential casing 47 receive the tens of millimeters from the gear train D' and transmit them via the two planet wheels likewise to the sun wheel 60, which is mounted on the hub of the gear wheel 61 meshing with the gear wheel 22 of the nut 18.

The information received from the dimension storage band 8 is thus combined and transmitted via a scanning device and fifty compressed air conduit pipes to the fifty cylinders of the five piston groups A, B, C, D and E. These effect the adjustment and fixing of the measurements derived from the incoming information by selecting the rotational setting of the cam disc 27 which determines the rotational setting of the measuring roller 3, and of the cam discs 34, 35, 36 and 37 which, via the gear trains B', C', D' and E' that produce the necessary transmission ratios, transmit the set in values to the differentials I, II and III. In the differentails, the values are combined and transmitted to the nut 18 where they serve for subdividing the hundred millimetre step corresponding to the momentary setting of the measuring roller.

Meshing with the gear wheel 22 of the nut 18 is a further gear wheel 62 which transmits the torque from a series of three spiral springs 63 (FIGS. 1 and 9) to the gear trains, in order to eliminate inaccuracies due to lateral play in the gear wheels by maintaining the lateral contact always in the same direction. In order to make the manner of operation clearer, FIG. 9 shows a section through one of the three spiral springs 63.

To obtain axial fine adjustment of the measuring roller 3 to a zero point after the device has been assembled on a machine, the gear teeth 49, 64 and 65 are connected to their shafts without play by stressed resilient annular discs 66. The connection is made by tightening the nuts 67, which are formed on their outer diameter as gear wheels, with the aid of a key 68. The key 68 can, in a completely assembled device, be inserted through an opening formed in the casing thereof near the nut in question and engaged with the nut 67. Normally the openings for the key 68 are closed by screw plugs 69.

The coarse and fine measurement selecting device described above has the advantage that, with the exception of the compressed air necessary for the scanning of the dimension storage band and for the operation of the piston groups A, B, C, D and E, it is a wholly mechanical system, the reliability and accuracy of which is achieved by mechanical means. The form of construction of the measuring roller ensures that the accuracy of the lengths of the flattened surfaces 4 can be corrected subsequently, which, for example, would never be possible with a screw-threaded rod of equal length. Furthermore, the measuring roller, without any additional expense, determines the direction of the required displacement of the slide. The new position can in each case be directly ascertained from the old position.

Further, it is possible, by selecting suitably small displacement steps, using two coordinates and synchronising their advances, to derive curves in accordance with the predetermined dimensions. Due to the fact that only a short screw-threaded spindle is necessary for subdividing the hundredth of a millimetre steps of the measuring roller, its accuracy can be substantially greater than that of a long screw-threaded rod.

The cost of manufacture of the device according to the invention is very low compared to that of previously known solutions of the problem which employed non-mechanical means, a fact which, in many cases, makes the introduction of automatic setting of measurements into machine tools possible for the first time. With this comes the advantage that the measured values are obtained without the need to resolve them. Also no specially high power is necessary either for preparing the dimension storage device or for regulating the machine, since the insertion of the rivet heads in holes in the dimension storage band and also the necessary replacement of the same when setting up the machine are quite simple operations.

Naturally the invention is not limited to the constructional embodiment described above and illustrated in the drawings, but it comprises all variants within the scope of the essential inventive concept. For example the measuring roller can be differently constructed and arranged and the subdivision of the ranges of measurements can be otherwise than in steps of 100 millimetres. Finally it may be remarked that a device according to the invention could possibly be used also for other purposes than for limiting the travel of the slides of machine tools, wherever there is a question of needing to control the movements of machine parts automatically according to predetermined numerical values.

I claim:

1. Device for automatically adjusting or limiting the travel of a slide for machine tools or the like with the aid of a scale on which are indicated the programmed measured values comprising a feeler element, a measuring roller rotatably mounted and axially slidable and having on its circumference flattened surfaces of various different lengths and ending in measuring surfaces for cooperation with the feeler element, and adjusting means connected to rotate the said measuring roller for coarse adjustment to the flattened part corresponding to the required approximate value, said adjusting means being set in operation according to the said programmed values and being axially displaceable for fine adjustment through a distance corresponding to the exact value within the range between successive approximate values provided by the coarse adjustment.

2. Device according to claim 1, in which the measuring roller is provided with ten flattened surfaces distributed at angular intervals of 36° around its circumference, and the said flattened surfaces progressively increasing one with respect to the other by equal amounts and their measuring surfaces being formed by their plane surfaces at their ends.

3. Device according to claim 1, in which the measuring roller is provided with ten flattened surfaces distributed at angular intervals of 36° around its circumference, and the said flattened surfaces progressively increasing one with respect to the other by equal amounts and their measuring surfaces being formed by their plane surfaces at their ends, the distances between the different lengths of the flattened surfaces each amount to 100 mm.

4. Device according to claim 1, in which the measuring roller is axially slidable over a distance of a hundred millimetres.

5. Device for automatically adjusting or limiting the travel of a slide for machine tools or the like with the aid of a scale on which are indicated the programmed measured values comprising a feeler element, a measuring roller rotatably mounted and axially slidable and having on its circumference flattened surfaces of various different lengths and ending in measuring surfaces for cooperation with the feeler element, and adjusting means connected to rotate the said measuring roller for coarse adjustment to the flattened part corresponding to the required approximate value, said adjusting means being set in operation according to the said programmed values and being axially displaceable for fine adjustment through a distance corresponding to the exact value within the range between successive approximate values provided by the coarse adjustment, the adjusting means consist of bodies which are cylindrical and arranged to rotate about their axes, each of said bodies being provided with two cam surfaces sloping upwardly from a common lower-most point, a plurality of pistons of which one is urged towards the cam surface of said cam surfaces by the pistons actuated by a pressure fluid, and means carrying the cam surfaces being displaced by the force acting at right angles to the axis of the cam until the lower-most point of the cam surfaces is brought into a position in which it lies directly beneath the center of the piston exerting the displacement-producing force.

6. Device as claimed in claim 5, in which the pistons acting against the cam surfaces are distributed over a curved arc of less than 180° so that the highest point of the cam surfaces always remains outside the arc of the group of pistons.

7. Device as claimed in claim 5, in which the cam discs are arranged coaxially one within the other around a common axis and are mounted by means of a central sleeve in a cylindrical casing.

8. Device as claimed in claim 5, in which pinions and gear wheels on planetary shafts are provided so that the cam surfaces which are arranged coaxially one within the other, are connected with the pinions which are also coaxially arranged and lie close to one another, and the said pinions meshing with the gear wheels on the planetary shafts arranged around the axis of the cam surfaces for the purpose of transmitting the rotary movements of the cams to the measuring roller.

9. Device as claimed in claim 5, in which pinions and gear wheels on planetary shafts are provided so that the cam surfaces which are arranged coaxially one within the other, are connected with the pinions which are also coaxially arranged and lie close to one another, and the said pinions meshing with the gear wheels on the planetary shafts arranged around the axis of the cam surfaces for the purpose of transmitting the rotary movements of the cams to the measuring roller, the sum of the rotary movements being transmitted to a screw-threaded nut which by its rotation is adapted to displace the measuring roller through a corresponding fixed distance.

10. Device as claimed in claim 5, in which pinions and gear wheels on planetary shafts are provided so that the cam surfaces which are arranged coaxially one within the other, are connected with the pinions which are also coaxially arranged and lie close to one another, and the said pinions meshing with the gear wheels on the planetary shafts arranged around the axis of the cam surfaces for the purpose of transmitting the rotary movements of the cams to the measuring roller, the sum of the rotary movements being transmitted to a screw-threaded nut which by its rotation is adapted to displace the measuring roller through a corresponding fixed distance, and in which at least one torsion spring is provided acting on the nut so that the gear trains drivably connected to the latter always have the flanks of their gear teeth drivably engaged in the same direction.

11. Device according to claim 1, in which the measuring roller is mounted so that it is rotatable in a sleeve which can be moved to and fro.

12. Device according to claim 1, in which the rotation of the measuring roller is controlled by a cam disc the rotary movement of which is transmitted to the measuring roller by gearing having a gear ratio that it can cause the measuring roller to perform a complete revolution.

References Cited by the Examiner

UNITED STATES PATENTS 2,710,934   6/55   Senn.
2,961,739   11/60  Kirchhofer _____ 90—13.5 X WILLIAM W. DYER, JR., *Primary Examiner.*
LEON PEAR, *Examiner.*